United States Patent
Hiraoka (10) Patent No.: US 9,004,386 B2
(45) Date of Patent: Apr. 14, 2015

(54) SPINNING REEL FISHING LINE GUIDE MECHANISM AND SPINNING REEL

(71) Applicant: Shimano Inc., Sakai, Osaka (JP)

(72) Inventor: Hirokazu Hiraoka, Osaka (JP)

(73) Assignee: Shimano Inc., Osaka (JP)

(*) Notice: Subject to any disclaimer, the term of this patent is extended or adjusted under 35 U.S.C. 154(b) by 69 days.

(21) Appl. No.: 13/778,617

(22) Filed: Feb. 27, 2013

(65) Prior Publication Data
US 2013/0256438 A1 Oct. 3, 2013

(30) Foreign Application Priority Data
Mar. 29, 2012 (JP) ................................ 2012-076228

(51) Int. Cl.
*A01K 89/01* (2006.01)
(52) U.S. Cl.
CPC .................................. *A01K 89/0108* (2013.01)
(58) Field of Classification Search
USPC .................................. 242/228, 230, 231, 234
See application file for complete search history.

(56) References Cited

U.S. PATENT DOCUMENTS

| | | | | |
|---|---|---|---|---|
| 5,558,289 A | * | 9/1996 | Hirayama et al. | 242/231 |
| 7,967,232 B2 | * | 6/2011 | Hiraoka et al. | 242/231 |
| 2002/0100828 A1 | * | 8/2002 | Sugawara | 242/231 |

FOREIGN PATENT DOCUMENTS

| | | |
|---|---|---|
| EP | 1226754 A1 | 7/2002 |
| EP | 2316265 A1 | 5/2011 |
| JP | 10-234277 A | 9/1998 |

OTHER PUBLICATIONS

Extended European Search Report of the corresponding European Application No. 113159837.7, dated Jul. 3, 2013.

* cited by examiner

*Primary Examiner* — Emmanuel M Marcelo
(74) *Attorney, Agent, or Firm* — Global IP Counselors (57) ABSTRACT

A spinning reel fishing line guide mechanism for guiding a fishing line onto a spool includes a support member and a fixation member. The spinning reel fishing line guide mechanism is attached to a tip of a rotor arm and is pivotable between a fishing-line guide position and a fishing-line release position. The support member is attached pivotably to the tip of the rotor arm. The support member includes an outer member made of metal and an inner member made of synthetic resin. The inner member is fixed to an inner surface of the outer member.

7 Claims, 11 Drawing Sheets

SPINNING REEL FISHING LINE GUIDE MECHANISM AND SPINNING REEL

CROSS-REFERENCE TO RELATED APPLICATIONS

This application claims priority to Japanese Patent Application No. 2012-076228 filed on Mar. 29, 2012. The entire disclosure of Japanese Patent Application No. 2012-076228 is hereby incorporated herein by reference.

BACKGROUND OF THE INVENTION

1. Field of the Invention

The present invention relates to a fishing line guide mechanism, particularly to a spinning reel fishing line guide mechanism, which is attached to the tips of rotor arms while being pivotable between a fishing-line guide position and a fishing-line release position in order to guide a fishing line onto a spool, and a spinning reel.

2. Background Art

Spinning reels include a fishing line guide mechanism on the tip of a rotor in order to guide a fishing line onto a spool. The rotor has a cylindrical portion, a first rotor arm, and a second rotor arm. The cylindrical portion is rotatably attached to a reel unit. The first and second rotor arms are integrally formed with the rear part of the cylindrical portion while being opposed to each other. The fishing line guide mechanism is attached to the tips of the two rotor arms while being pivotable between a fishing-line guide position and a fishing-line release position. A fishing line guide mechanism of this type includes a first support member, a second support member, and a bail. The first support member is pivotably mounted to the first rotor arm, whereas the second support member is pivotably mounted to the tip of the second rotor arm. The bail couples the first support member and the second support member. A line roller, a fixation shaft and a fixation shaft cover are attached to the tip of the first support member. The line roller serves to guide the fishing line, whereas the fixation shaft serves to support the line roller. The first support member is an exemplary support member. One end of the bail is fixed to the fixation shaft cover, whereas the other end of the bail is swaged to the second support member (see e.g., Japan Laid-open Patent Application Publication No. JP-A-H10-234277). A bail flip mechanism is disposed between the first support member and the first rotor arm. The bail flip mechanism is a mechanism configured to return the fishing line guide mechanism taking a fishing-line releasing position to a fishing-line winding position in conjunction with rotation of the rotor in a fishing-line winding direction.

In such fishing line guide mechanism, the first support member, which is pivotably attached to the first rotor arm, is made of aluminum alloy and has a plated layer formed on the outer surface of the support member by plating for preventing the outer peripheral part of the support member from being scratched. The support member has complex shaped portions formed on the inner surface thereof, including a coupling structure such as an engaging portion for coupling thereto the bail flip mechanism and a restriction structure such as a protrusion for restricting a pivot range of the support member.

SUMMARY

The aforementioned fishing line guide mechanism includes the support member made of metal, and therefore, cannot be easily reduced in weight. Further, it is required to form, on the support member made of metal, the coupling structure for coupling the bail flip mechanism to the support member and the restriction mechanism for restricting a pivot range of the support member. Therefore, the support member is required to be machined, and thereby, the manufacturing cost of the support member is increased.

It is an advantage of the present invention to achieve reduction in weight of a support member and inhibit cost increase in a fishing line guide mechanism for a spinning reel.

A spinning reel fishing line guide mechanism for guiding a fishing line onto a spool includes a support member and a fixation member. The spinning reel fishing line guide mechanism is attached to a tip of a rotor arm and is pivotable between a fishing-line guide position and a fishing-line release position. The support member is attached pivotably to the tip of the rotor arm. The support member includes an outer member made of metal and an inner member made of synthetic resin. The inner member is fixed to an inner surface of the outer member.

BRIEF DESCRIPTION OF THE DRAWINGS

Referring now to the attached drawings which form a part of this original disclosure.

DETAILED DESCRIPTION OF THE PREFERRED EMBODIMENTS

First Embodiment

Figure 1:
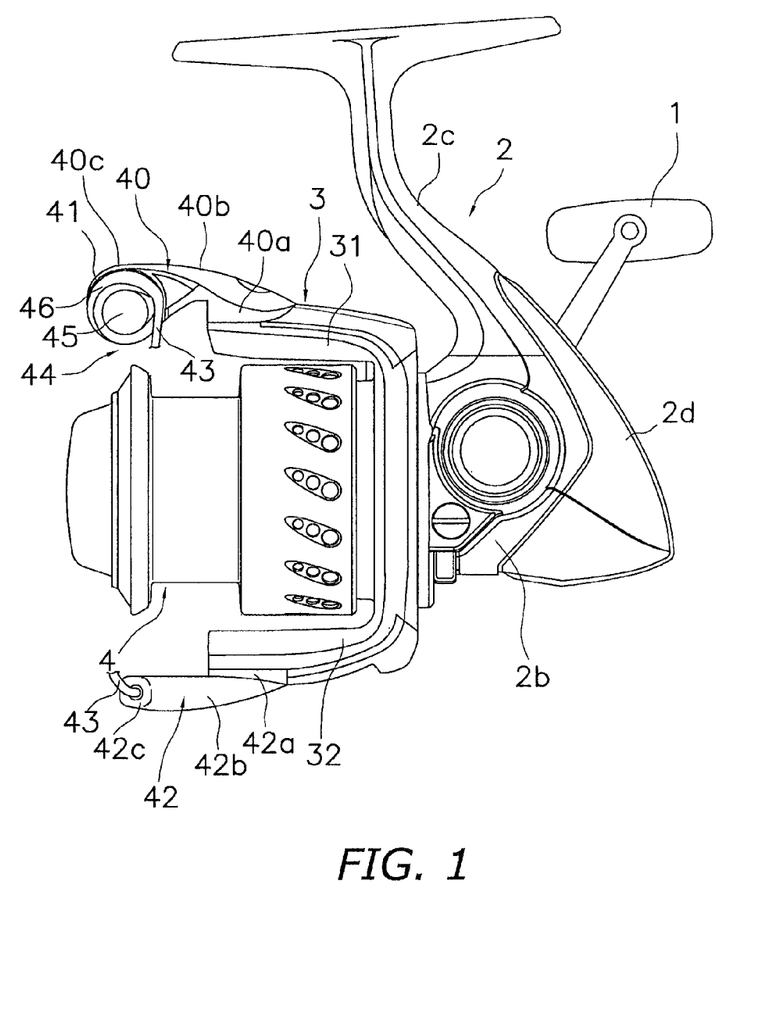
FIG. 1 is a slide view of a spinning reel according to a first embodiment of the present invention.

As illustrated in FIG. 1, a spinning reel of an exemplary embodiment of the present invention includes a handle 1, a reel unit 2, a rotor 3, and a spool 4. The reel unit 2 supports the handle 1 in a rotatable state. The rotor 3 is rotatably supported at the front of the reel unit 2. The spool 4 serves to wind a fishing line onto the outer peripheral surface thereof The spool 4 is disposed at the front of the rotor 3 while being movable back and forth. It should be noted that the handle 1 is attachable to either of the right and left sides of the reel unit 2.

Figure 2:
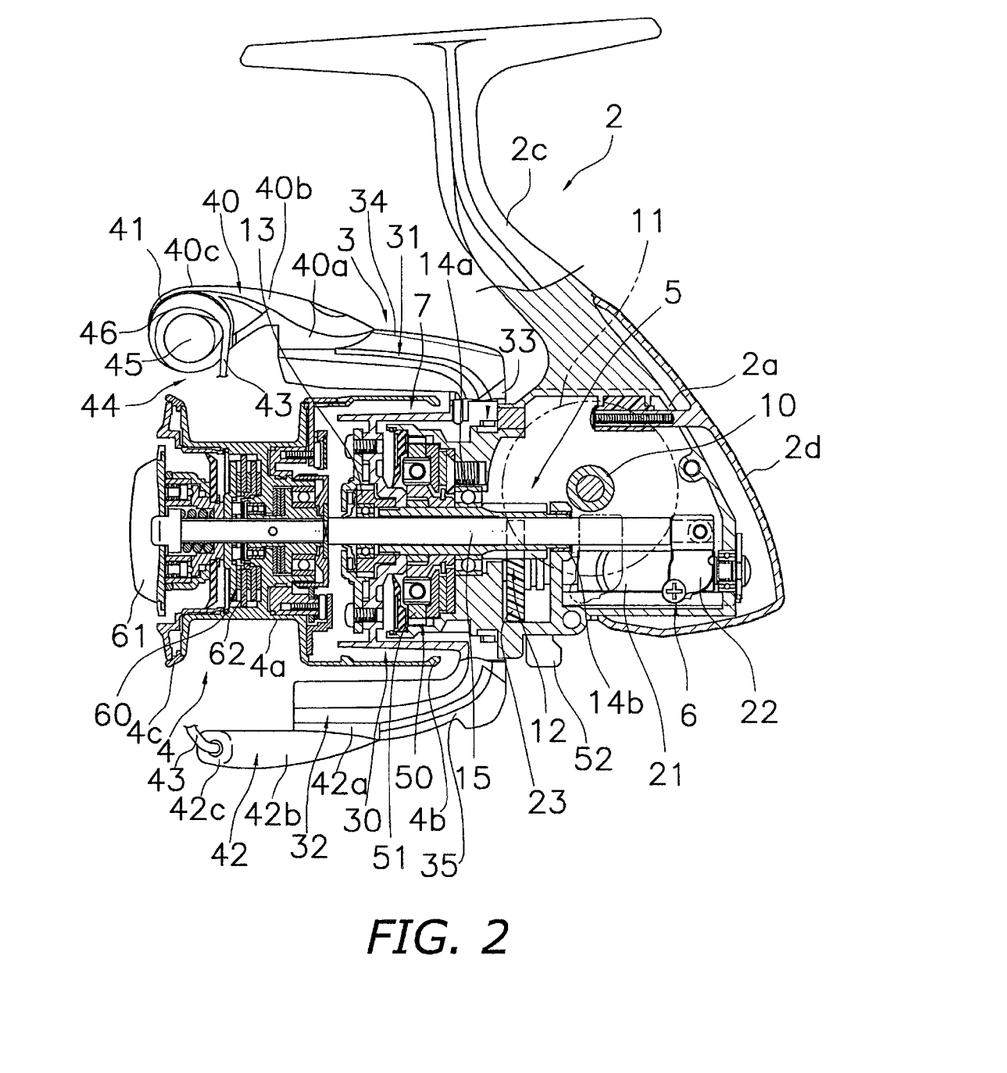
FIG. 2 is a cross-sectional side view of the spinning reel.

As illustrated in FIG. 2, the reel unit 2 includes a reel body 2a and a lid member 2b (see FIG. 1). The reel body 2a has a space in the inside thereof The lid member 2b is detachably attached to the reel body 2a for closing the space of the reel body 2a. Further, the reel unit 2 includes a main body guard 2d for covering the rear part of the reel body 2a and that of the lid member 2b.

As illustrated in FIG. 2, the reel body 2a is a member made of, for instance, light metal alloy (e.g., magnesium alloy or aluminum alloy). Further, a fishing rod attachment leg 2c is integrally formed with the upper part of the reel body 2a. The fishing rod attachment leg 2c has a T-shape of which an upper part extends back and forth. As illustrated in FIG. 2, the reel body 2a accommodates a rotor drive mechanism 5 and an oscillation mechanism 6 in the space thereof As illustrated in FIG. 1, the lid member 2b is made of for instance, light metal alloy (e.g., magnesium alloy or aluminum alloy). For example, the front part of the lid member 2b is fixed to the reel body 2a by two fixation bolts, while the fixed portions are hidden by the rotor 3. On the other hand, the rear part of the lid member 2b, which is disposed away from the rotor 3, is fixed to the reel body 2a by a single fixation bolt.

As illustrated in FIG. 2, the rotor drive mechanism 5 includes a face gear 11 and a pinion gear 12. The face gear 11 is configured to be rotated together with a master gear shaft 10 to which the handle 1 is fixed. The pinion gear 12 is meshed with the face gear 11. The pinion gear 12 has a tubular shape. The front part of the pinion gear 12 is fixed to the rotor 3 by a nut 13 while penetrating the center part of the rotor 3. Further, an axially intermediate portion of the pinion gear 12 is rotatably supported by the reel unit 2 through a first bearing 14a, whereas the axially rear end portion of the pinion gear 12 is rotatably supported by the reel unit 2 through a second bearing 14b.

As illustrated in FIG. 2, the oscillation mechanism 6 is configured to move back and forth a spool shaft 15 coupled to the center part of the spool 4 through a drag mechanism 60 for moving the spool 4 in the same direction as the spool shaft 15. The oscillation mechanism 6 includes a warm shaft 21, a slider 22, and an intermediate gear 23. The warm shaft 21 is disposed below and in parallel to the spool shaft 15. The slider 22 is configured to be moved back and forth along the warm shaft 21. The intermediate gear 23 is fixed to the tip of the warm shaft 21. The spool shaft 15 is non-rotatably fixed to the slider 22 with the rear end thereof. The intermediate gear 23 is meshed with the pinion gear 12.

As illustrated in FIG. 2, the rotor 3 includes a rotor unit 7, a first cover member 33, a second cover member 33, and a third cover member 35. The rotor unit 7 is rotatable with respect to the reel unit 2 about an axis extending along the back-and-forth direction. The first cover member 33 covers the rear part of the rotor unit 7. The second cover member 34 covers the outer surface of a first rotor arm 31, whereas the third cover member 35 covers the outer surface of a second rotor arm 32.

As illustrated in FIG. 2, the rotor unit 7, made of aluminum alloy, for instance, is non-rotatably coupled to the pinion gear 12 while being rotatable with respect to the reel unit 2. The rotor unit 7 includes a tubular part 30, the first rotor arm 31, and the second rotor arm 32. The tubular part 30 has a recessed dent on the rear part thereof for disposing therein a cylindrical portion formed as the front portion of the reel unit 2. The first and second rotor arms 31 and 32 are connected to the rear part of the tubular part 30 at opposed positions. Each of the first and second rotor arms 31 and 32 also extends forwards while being separated from the tubular part 30 at a predetermined interval.

As illustrated in FIG. 2, the tubular part 30 has a disc-shaped wall on the inner peripheral side of the front part thereof. Further, the wall has an annular boss in the center part thereof. The boss is coupled to the pinion gear 12 while being unitarily rotatable therewith. The front part of the pinion gear 12 is non-rotatably engaged with the center of the boss. Further, the nut 13 is screwed onto the tip of the pinion gear 12. The rotor unit 7 is thereby fixed to the pinion gear 12.

The first cover member 33 is structured for covering the rear part of the rotor unit 7 while being disposed in the surrounding of the tubular part 30. The second cover member 34 is a member for covering the first rotor arm 31 from the outside. The second cover member 34 is coupled to the first rotor arm 31 by a fixation bolt to be screwed into the first rotor arm 31.

As illustrated in FIG. 2, the second cover member 34 is jointed to the first cover member 33 and the first rotor arm 31 for forming a three-dimensionally curved plane. The tip portion of the second cover member 34 is cut out in a roughly semicircular shape for disposing therein a first bail support member 40 (an exemplary support member of the present invention) to be described.

As illustrated in FIG. 2, the third cover member 35 is a member for covering the second rotor arm 32 from the outside. The third cover member 35 is fixed to the second rotor arm 32 by a fixation bolt and a nut member to be screwed onto the fixation bolt. Similarly to the second cover member 34, the third cover member 35 is joined to the first cover member 33 and the second rotor arm 32 for forming a three-dimensionally curved plane. The fixation bolt herein has a function of supporting a second bail support member 42 to be described in a pivotable state as well as a function of fixing the third cover member 35 to the rotor unit 7.

A bail arm 44 (an exemplary fishing-line guide mechanism) is pivotably attached to the tip of the first rotor arm 31 and that of the second rotor arm 32. The bail arm 44 includes the first bail support member 40, the second bail support member 42, a bail 43, a fixation shaft 45, a line roller 41, and a fixation shaft cover 46. The first bail support member 40 is an exemplary support member. The bail arm 44 is pivotable between a fishing-line guide position illustrated in FIG. 2 and a fishing-line release position flipped from the fishing-line guide position.

Figure 3:
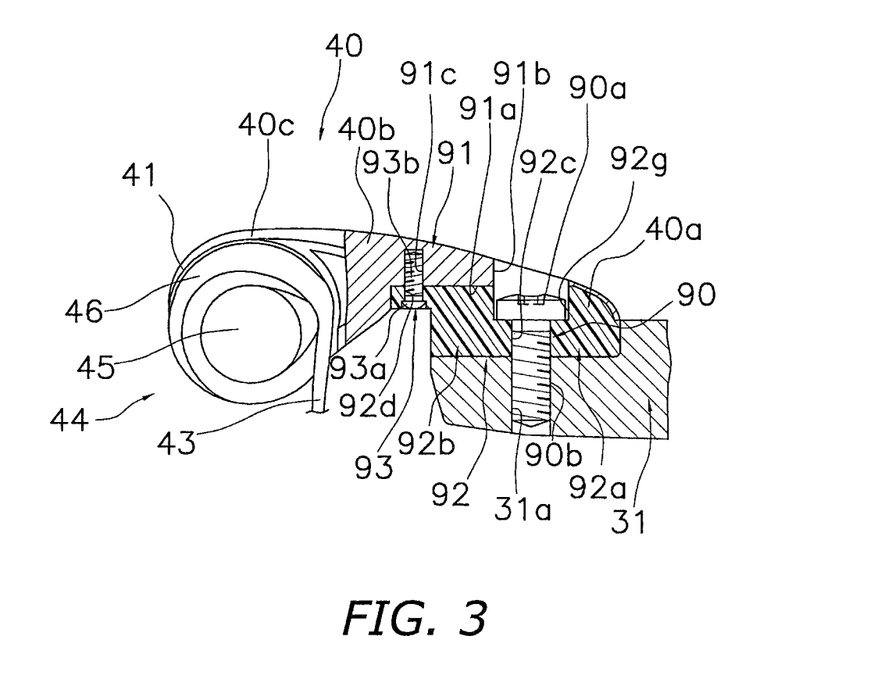
FIG. 3 is an enlarged cross-sectional view of a first bail support member.
Figure 4:
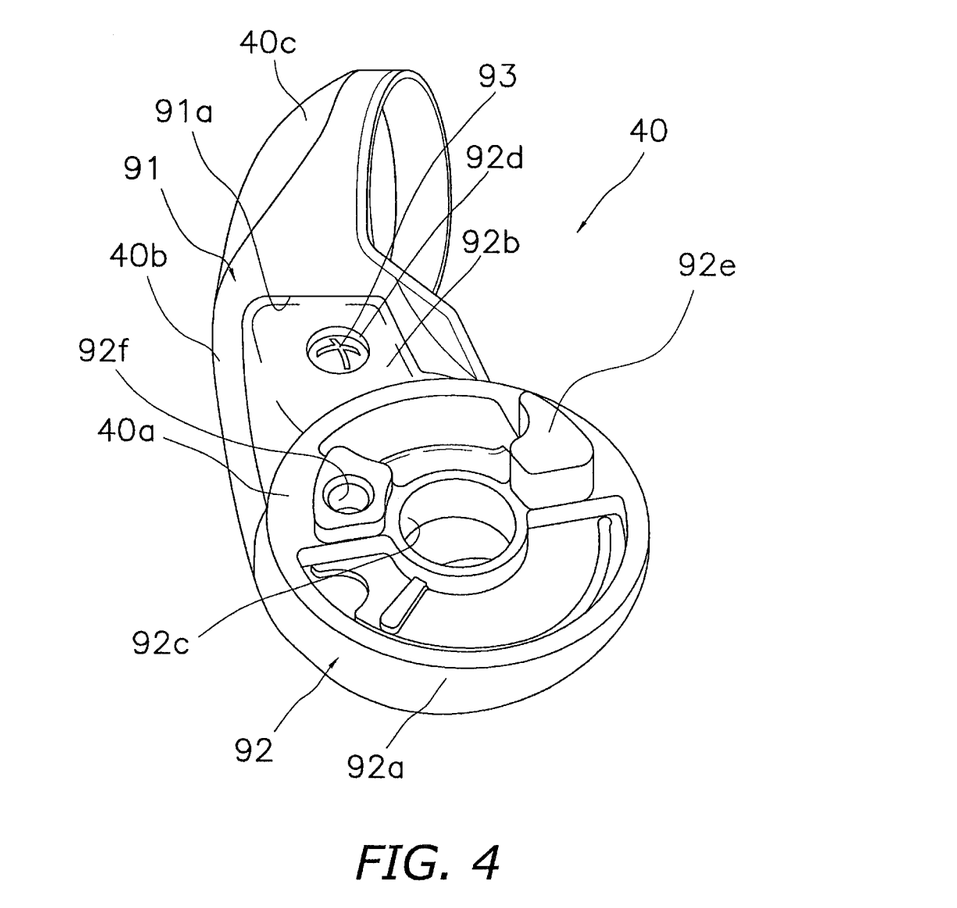
FIG. 4 is a perspective view of the first bail support member.

The first bail support member 40 is a member pivotably attached to the tip of the first rotor arm 31. As illustrated in FIGS. 3 and 4, the first bail support member 40 includes an outer member 91 and an inner member 92. The outer member 91 is made of aluminum alloy and the outer surface thereof is plated. The inner member 92 is made of synthetic resin and is fixed to the inner surface of the outer member 91. The first bail support member 40 is pivotably supported with respect to the outer side of the first rotor arm 31 through a fixation member 90 of a bolt form. The fixation member 90 has a head 90a and a threaded shaft 90b having a diameter smaller than that of the head 90a.

As illustrated in FIG. 3, the outer member 91 is a member with a smoothly curved outer surface. The outer member 91 is a member made of aluminum alloy and is formed by, for instance, die casting. The outer member 91 has a plated layer formed on the outer peripheral surface thereof by plating. The outer member 91 has a recess 91a, a first through hole 91b, and a threaded hole 91c. The recess 91a is recessed on the inner surface of the front-side (i.e., the left side in FIG. 3) part of the outer member 91. The first through hole 91b penetrates the inner and outer surfaces of the rear-side (i.e., the right side in FIG. 3) part of the outer member 91. The fixation member 90 is screwed into the first rotor arm 31 while penetrating the first through hole 91b. The threaded hole 91c is recessed on the inner surface of the front end of the recess 91a. A screw member 93 is screwed into the threaded hole 91c for fixing the inner member 92 to the outer member 91.

The inner member 92 is attached and fixed to the recess 91a. The inner member 92 is fixed to the inner surface of the outer member 91 by the screw member 93. As illustrated in FIG. 4, the inner member 92 is a member made of synthetic resin and is formed by injection molding. The inner member 92 has a first portion 92a and a second portion 92b integrally formed with the first portion 92a. The first portion 92a is formed on the rear side (i.e., the lower side in FIG. 4) of the inner member 92. The first portion 92a has a seating recess 92g and a second through hole 92c in the center part thereof. The seating recess 92g serves to dispose thereon the head 90a of the fixation member 90. The second through hole 92c serves to insert therein a shaft portion 90b of the fixation member 90. As illustrated in FIG. 3, the second through hole 92c is a through hole that penetrates the first portion 92a from inside to outside while being communicated with the first through hole 91b. As illustrated in FIG. 4, a restriction protrusion 92e and a holding hole 92f are formed on the inner surface of a part surrounding of the second through hole 92c of the inner member 92. The restricting protrusion 92e restricts the pivot range of the first bail support member 40. The holding hole 92f holds a toggle spring mechanism of a bail flip mechanism (not illustrated in the figures). Further, a plurality of thickness reduced portions are formed on the inner surface of the inner member 92 for achieving weight reduction of the inner member 92.

The second portion 92b is integrally formed with the first portion 92a on its rear side (i.e., the lower side in FIG. 4). The second portion 92b is attached to the recess 91a of the outer member 91. As illustrated in FIG. 3, the second portion 92b has a third through hole 92d in the front end thereof. The third through hole 92d is a stepped through hole penetrating the second portion 92b from inside to outside. The third through hole 92d is communicated with the threaded hole 91c of the outer member 91. The screw member 93 has a head 93a and a threaded shaft 93b having a diameter less than that of the head 93a. The screw member 93 is inserted from the inner side of the inner member 92. The tip of the threaded shaft 93b is screwed into the threaded hole 91c formed in the outer member 91 while the head 93a makes contact with the peripheral edge of the third through hole 92d. Thus, the inner member 92 is fixed to the inner surface of the outer member 91 by the screw member 93.

The fixation member 90 penetrates the first through hole 91b of the outer member 91 while being inserted from the outer side of the outer member 91. The tip of the threaded shaft 90b is screwed into a threaded hole 31a formed in the first rotor arm 31, while the head 90a having a large diameter makes contact with the seating recess 92g formed about the second through hole 92c. Accordingly, the first bail support member 40 is pivotably attached to the first rotor arm 31.

As illustrated in FIGS. 1 to 3, the first bail support member 40 has a first rotary support portion 40a, a first arm portion 40b and a first attached portion 40c. The first rotary support portion 40a is pivotably attached to the first rotor arm 31. The first arm portion 40b forwardly extends from the first rotary support portion 40a. The first attached portion 40c has a roughly circular shape. The first rotary support portion 40a is mounted on the outer member 91 and the inner member 92. The first arm portion 40b is roughly mounted on the outer member 91. The first attached portion 40c is entirely mounted on the outer member 91. The first attached portion 40c is integrally molded with the tip of the first arm portion 40b. The line roller 41, the fixation shaft 45 and the fixation shaft cover 46 of the bail arm 44 are attached to the first attached portion 40c.

Figure 5:
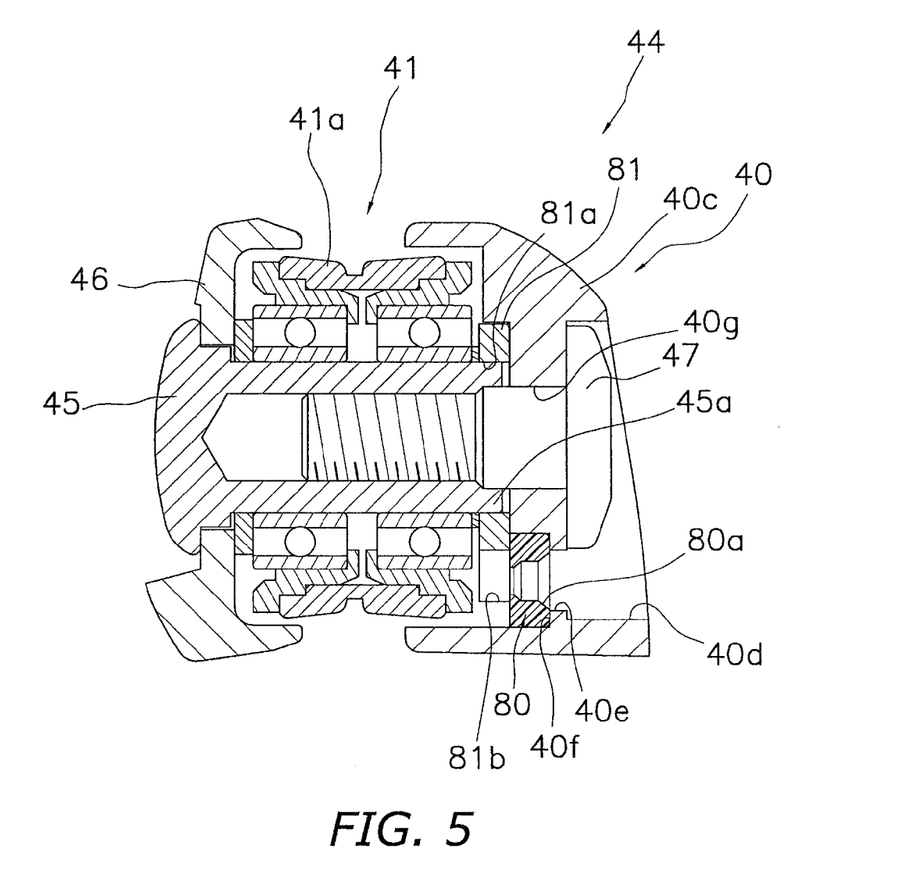
FIG. 5 is an enlarged cross-sectional view of a bail arm.
Figure 6:
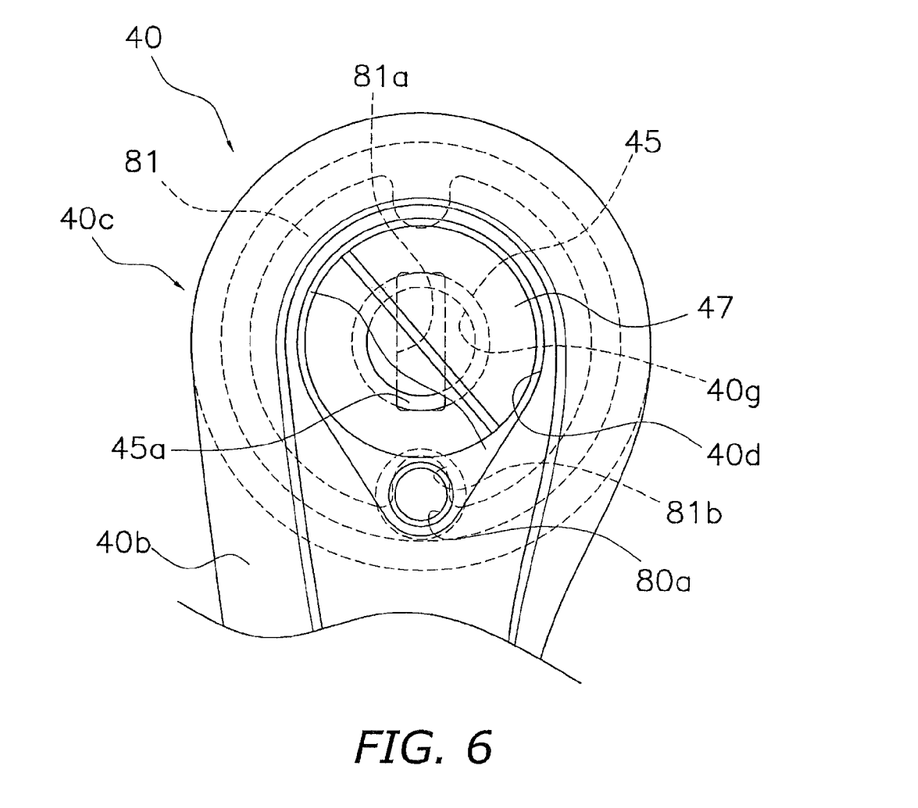
FIG. 6 is a plan view of a tip portion of the bail arm.

As illustrated in FIGS. 5 and 6, the first attached portion 40c has a recess 40d, a fourth through hole 40e, and a fifth through hole 40g. The recess 40d is recessed inwards (leftwards in FIG. 5) on the first attached portion 40c for forming a roughly raindrop-like portion in the surrounding of a part to which a fixation bolt 47 to be screwed into the fixation shaft 45 is attached. The fifth through hole 40g is formed in the roughly large circular base of the roughly raindrop-like portion of the recess 40d. The fixation bolt 47 is inserted into the fifth through hole 40g. The fourth through hole 40e is formed in the roughly small circular tip of the roughly raindrop-like portion of the recess 40d. The fourth through hole 40e is provided for attaching a cap member 80 to the first attached portion 40c from the inner side of the first bail support member 40. As illustrated in FIG. 5, the fourth through hole 40e for attaching the cap member 80 is disposed in the vicinity of the fifth through hole 40g for attaching the fixation bolt 47. The fourth through hole 40e is a through hole penetrating the first attached portion 40c for making the inner peripheral part of a roller 41a of the line roller 41 visible from the outside of the first bail support member 40, while the fixation bolt 47 is attached to the fifth through hole 40g. The fourth through hole 40e has a stepped portion 40f protruding radially inwards. When the cap member 80 is attached to the fourth through hole 40e from the inner side of the first bail support member 40, the outer face of the cap member 80 makes contact with the stepped portion 40f. Accordingly, the cap member 80 is positioned not to protrude to the outer side of the first bail support member 40.

The cap member 80 is a roughly cylindrical member made of synthetic resin. The cap member 80 is attached to the fourth through hole 40e of the first bail support member 40 from the inner side of the first bail support member 40. The cap member 80 is an annular member and has an oil filler port 80a in the center part thereof The oil filler port 80a is a small aperture for feeding lubricating oil to the inner peripheral part of the line roller 41. The cap member 80 is fixed to the first bail support member 40 when a plate-shaped retainer member 81 is pressed and attached to the first bail support member 40 from the inner side while making contact with the inner face of the cap member 80.

Figure 7:
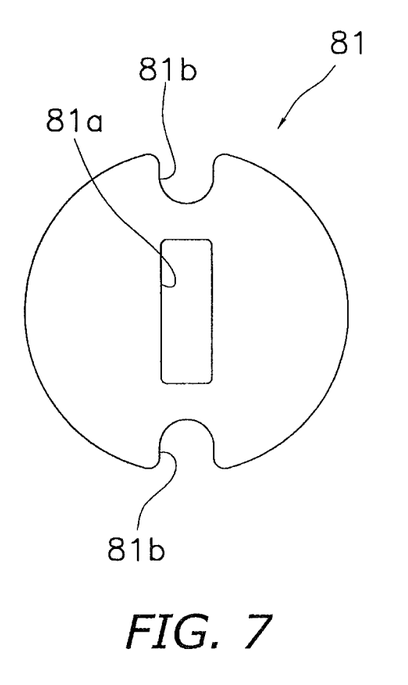
FIG. 7 is an enlarged front view of a retainer member seen from inside.

As illustrated in FIGS. 5, 6 and 7, the retainer member 81 has a sixth through hole 81a and two cut-out portions 81b. The sixth through hole 81a is formed in the center part of the retainer member 81. The sixth through hole 81a is communicated with the fifth through hole 40g for attaching therein the fixation bolt 47 of the first bail support member 40. The cut-out portions 81b are formed by partially cutting out the opposed portions of the retainer member 81. One of the cut-out portions 81b is communicated with the fourth through hole 40e of the first bail support member 40 and the oil filler port 80a of the cap member 80. As illustrated in FIG. 6, the sixth through hole 81a is formed as a non-circular hole having a roughly rectangular inner contour. The sixth through hole 81a is engaged with a non-circular portion 45a (see FIG. 5) formed on the tip of the fixation shaft 45 while being prevented from rotating relatively thereto. Therefore, the retainer member 81 can be simultaneously assembled with components of the line roller 41. Accordingly, the retainer member 81 is prevented from easily coming off in assembling.

As illustrated in FIG. 5, the line roller 41 is a member mounted on the tip of the first bail support member 40 in order to guide the fishing line onto the spool 4. The line roller 41 includes a tubular roller 41a and two bearings. The roller 41a has a groove formed on the outer peripheral surface thereof for guiding the fishing line. The bearings are axially disposed at an interval on the inner peripheral side of the roller 41a. The roller 41a is rotatably supported by the fixation shaft 45 through the bearings.

The fixation shaft 45 is a member protruding from the tip of the first bail support member 40 for supporting the line roller 41 in a rotatable state. The fixation shaft 45 is a nut member made of aluminum alloy and is formed separately from the fixation shaft cover 46. The fixation shaft 45 extends from its base end on the fixation shaft cover 46 side to its distal end on the first bail support member 40 side. The tip of the fixation shaft 45 is fixed to the first bail support member 40 by the fixation bolt 47.

The fixation shaft cover 46 is mounted on the base end of the fixation shaft 45. The fixation shaft cover 46 has an outer diameter greater than that of the line roller 41. The fixation shaft cover 46 is mounted on the base end of the fixation shaft 45 while being separated away from the attached portion of the first bail support member 40. The fixation shaft cover 46 is formed by die forming such as forging. The fixation shaft cover 46 is a roughly cone-shaped member having an apex displaced from the center thereof. With reference to the center of the fixation shaft 45, the apex of the fixation shaft cover 46 is directed rearwards of the reel while being directed in a radially outward direction of the spool 4. The bail 43 is integrally formed with the fixation shaft cover 46 while being displaced towards the fishing line guide side from the apex of the fixation shaft cover 46. The bail 43 is smoothly joined to a ridge portion formed in the vicinity of the apex of the fixation shaft cover 46.

As illustrated in FIGS. 1 and 2, the bail 43 is a member coupling the fixation shaft cover 46 and the second bail support member 42 in order to lead the fishing line onto the line roller 41. The bail 43 is a wire-like member. One end of the bail 43 is integrally formed with the fixation shaft cover 46 by forging of stainless alloy, whereas the other end of the bail 43 is swaged to the second bail support member 42. The bail 43 is disposed on the outer peripheral side of the spool 4 while being convexly curved. The bail 43 serves to lead the fishing line onto the line roller 41 through the fixation shaft cover 46 when the bail arm 44 is returned to the fishing-line guide position from the fishing-line release position.

The second bail support member 42 is a member pivotably attached to the tip of the second rotor arm 32. The second bail support member 42 is an arm member made of zinc alloy and serves to support an end of the bail 43. As illustrated in FIGS. 1, 2, and 4, the second bail support member 42 includes a second rotary support portion 42a, a second arm portion 42b and a second attached portion 42c. The second rotary support portion 42a is pivotably attached to the second rotor arm 32. The second arm portion 42b forwardly extends from the second rotary support portion 42a. The second attached portion 42c, to which the bail arm 44 of the bail 43 is attached, is integrally formed with the tip of the second arm portion 42b.

As illustrated in FIG. 2, the rotor 3 accommodates an anti-reverse rotation mechanism 50 in the inside of the tubular part 30. The anti-reverse rotation mechanism 50 is configured to prevent or allow reverse rotation of the rotor 3. The anti-reverse rotation mechanism 50 includes a one-way clutch 51 and a switch mechanism 52. The one-way clutch 51 is a roller-type one-way clutch that an inner race is allowed to freely rotate. The switch mechanism 52 is configured to switch the one-way clutch 51 between an activated state (i.e., a reverse rotation prevented state) and a deactivated state (i.e., a reverse rotation allowed state).

As illustrated in FIG. 2, the spool 4 is attached onto the tip of the spool shaft 15 through the drag mechanism 60 while being disposed between the first and second rotor arms 31 and 32 of the rotor 3. As illustrated in FIG. 2, the spool 4 has a bobbin trunk 4a, a skirt 4b and a front flange 4c. The bobbin trunk 4a is a portion for winding the fishing line about the outer periphery thereof. The skirt 4b is a tubular portion integrally formed with the rear end of the bobbin trunk 4a. The front flange 4c is a large diameter portion disposed on the front end of the bobbin trunk 4a.

As illustrated in FIG. 2, the drag mechanism 60 serves to brake rotation of the spool 4 and includes a drag regulation knob 61 and a braking part 62. The drag regulation knob 61 is screwed onto the tip of the spool shaft 15. The braking part 62 is configured to brake the spool 4 while being pressed by the drag regulation knob 61.

Next, an operation and an action of the reel will be explained.

In casting, the bail arm 44 is flipped over to the fishing-line releasing position. Accordingly, the first and second bail support members 40 and 42 pivot. Under the condition, an angler casts the fishing rod, while hooking the fishing line with the index finger of the hand holding the fishing rod. The fishing line is accordingly released with high momentum due to the weight of the terminal tackle. When the handle 1 is rotated in the fishing-line winding direction after the terminal tackle lands on water, the rotor 3 is rotated by the rotor drive mechanism 5 in the fishing-line winding direction. The bail arm 44 is accordingly returned to the fishing-line winding position by the bail flip mechanism (not illustrated in the figures). Reverse rotation of the rotor 3 is herein prevented, and therefore, releasing of the fishing line is stopped.

In winding the fishing line, the handle 1 is rotated in the fishing line winding direction. Rotation of the handle 1 is accordingly transmitted to the rotor 3 through the face gear 11 and the pinion gear 12, and thereby, the rotor 3 is rotated. In conjunction with rotation of the rotor 3, the fishing line guided onto the line roller 41 is wound about the spool 4.

In such bail arm 44 for the spinning reel, the first bail support member 40 includes the outer member 91 and the inner member 92. The outer member 91 is made of aluminum alloy and the outer surface thereof is plated. The inner member 92 is made of synthetic resin and has the second through hole 92c in the inner peripheral part thereof for inserting the fixation member 90 therethrough. Further, the inner member 92 is fixed to the inner surface of the outer member 91. Thus, the outer member 91 is herein an aluminum alloy member that the outer surface thereof is plated. Therefore, scratching of the outer peripheral part of the first bail support member 40 can be prevented. Further, the inner member 92 is herein a synthetic resin member having the second through hole 92 formed in the inner peripheral part thereof for inserting the fixation member 90 therethrough. Accordingly, unlike the well-known structures, swelling of plating is not produced in the surrounding of the second through hole 92c. Therefore, the first bail support member 40 smoothly pivots with respect to the first rotor arm 31. This can prevent occurrence of an erroneous action of the first bail support member 40.

Second Embodiment

In the second embodiment, members, portions, and the like, that is the same as the first embodiment is numbered the same. The members, the portions, and the like, that is the same as in the above embodiment will not be described again. Specifically, refer to the above embodiment for description that is omitted here.

Figure 10:
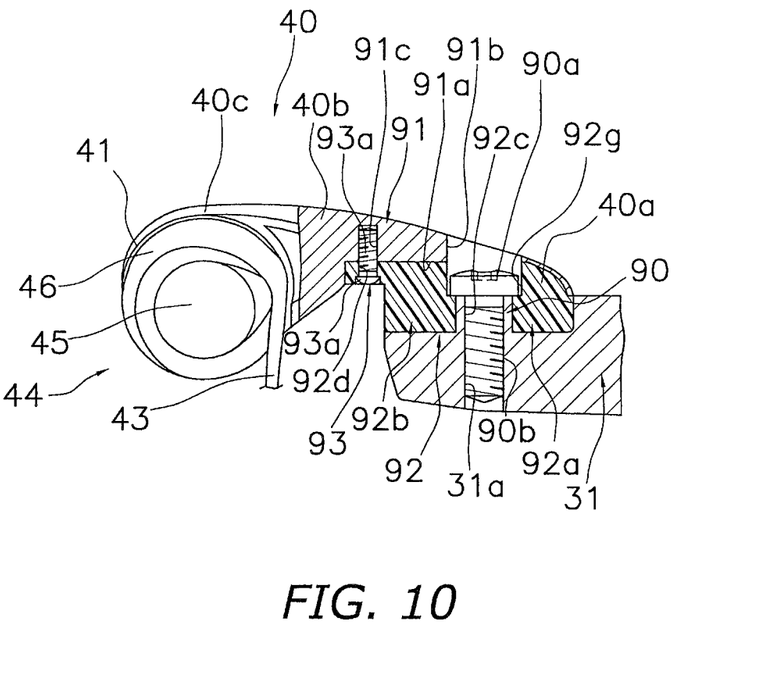
FIG. 10 is an enlarged cross-sectional view of a first bail support member according to a second embodiment of the present invention.

As illustrated in FIG. 10, the first bail support member 40 is a member pivotably attached to the tip of the first rotor arm 31. As illustrated in FIGS. 10, the first bail support member 40 includes an outer member 91 and an inner member 92. The outer member 91 is made of aluminum alloy and the outer surface thereof is plated. The inner member 92 is made of synthetic resin and is fixed to the inner surface of the outer member 91. The inner member 92 has a first portion 92a and a second portion 92b. The second portion 92b is integrally formed with the first portion 92a. The first portion 92a has a seating recess 92g and a second through hole 192c. The second through hole 192c serves to dispose thereon the boss portion 39.

The first bail support member 40 is pivotably supported with respect to the outer side of the first rotor arm 31 through a fixation member 90 of a bolt form. Specifically, a boss portion 39 is formed in outer side of the first rotor arm 31. The boss portion 39 is disposed in the second through hole 192c. In other words, the inner member 92 is rotatable with respect to the boss portion 39. A threaded hole 31a (a internal thread) is formed in the inner periphery of the boss portion 39. The first bail support member 40 is supported swingably on the outer side of the first rotor arm 31 by threadably mounting the fixation member 90 on the threaded hole 31a.

The fixation member 90 has a head 90a and a threaded shaft 90b. The threaded shaft 90b has a diameter smaller than that of the head 90a. The head 90a is disposed in the seating recess 92g. Specifically, the outer periphery of the head 90a engages with the first bail support member 40 by being disposed opposed to a bottom portion of the seating recess 92g. The threaded shaft 90b is threadably mounted on the threaded hole 31a of the boss portion 31a on the first rotor arm 31. The head 90a of the fixation member 90 abuts on the tip portion of the boss portion. Herewith, the first bail support member 40 (the inner member 92) is supported swingably on the outer side of the first rotor arm 31

Other Exemplary Embodiments (a) In the aforementioned first embodiment, the bail 43 and the fixation shaft cover 46 are integrally molded, whereas the fixation shaft 45 and the fixation shaft cover 46 are separately formed. However, the bail 43, the fixation shaft 45, and the fixation shaft cover 46 can be integrally molded. Alternatively, the bail 43, the fixation shaft 45 and the fixation shaft cover 46 can be separately formed. Further, the bail 43, the fixation shaft 45, and the fixation shaft cover 46 can be made of materials other than stainless alloy and aluminum alloy. Yet further, the bail 43, the fixation shaft 45 and the fixation shaft cover 46 can be manufactured by processing methods other than forging and cutting.

(b) In the aforementioned first embodiment, the bail arm 44 includes the second bail support member 42 and the bail 43. However, the present invention can be applied to the bail arm 44 of a bail-less type not including the second bail support member 42 and the bail 43.

(c) In the aforementioned first embodiment, the first bail support member 40 has been explained as an exemplary support member of the present invention. However, the present invention can be applied to the second bail support member 42.

Figure 8:
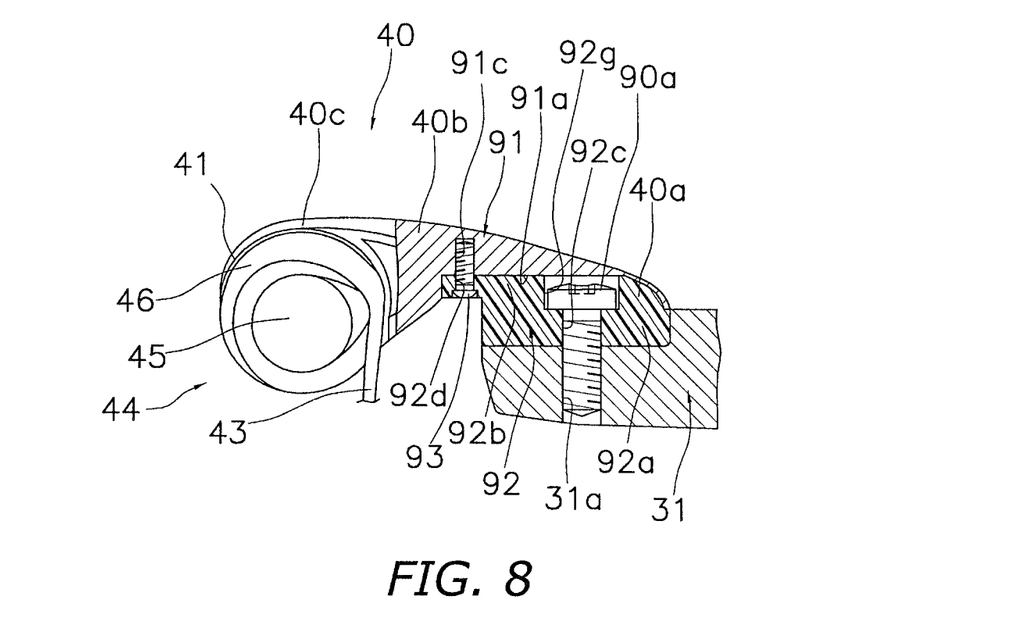
FIG. 8 is an another diagram corresponding to FIG. 3 according to the first embodiment.

(d) In the aforementioned first embodiment, the outer member 91 has the first through hole 91b inserting therein the fixation member 90. However, as illustrated in FIG. 8, the outer member 91 can not have the first through hole 91b. The fixation member 90 is herein fixed to the first rotor arm 31 while being inserted through the second through hole 92c of the inner member 92. Then, the inner member 92 is fixed to the outer member 91. In this case, the head of the fixation member 90 is not exposed to the outside of the outer member 91. Therefore, the fishing line can be prevented from getting stuck with the head of the fixation member 90.

Figure 9:
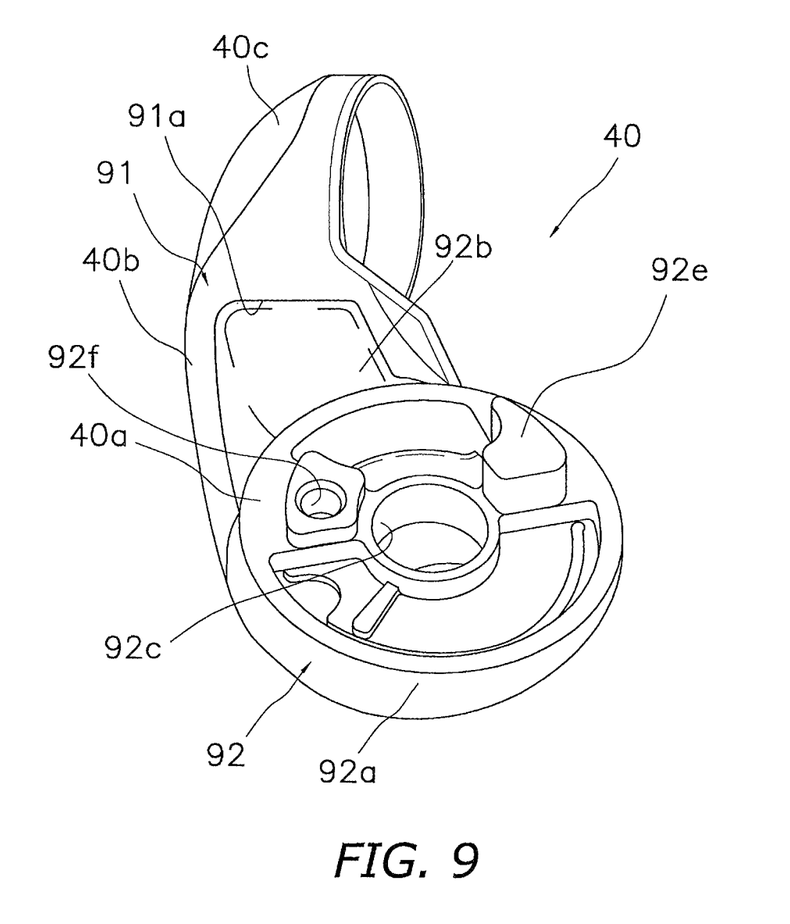
FIG. 9 is an another diagram corresponding to FIG. 4 according to the first embodiment.

(e) In the aforementioned first embodiment, the inner member 92 is fixed to the inner surface of the outer member 91 by the screw member 93. However, as illustrated in FIG. 9, the inner member 92 can be welded to the inner surface of the outer member 91.

(f) In the aforementioned first and second embodiment, the outer member 91 is formed by die casting. However, the outer member 91 can be formed by forging. Further, the outer member can be made of either magnesium alloy or stainless alloy other than aluminum alloy. Yet further, the outer member can be formed by pressing of a thin plate made of stainless alloy. When stainless alloy is used, plating is not required to be executed for the surface of the outer member.

Figure 11:
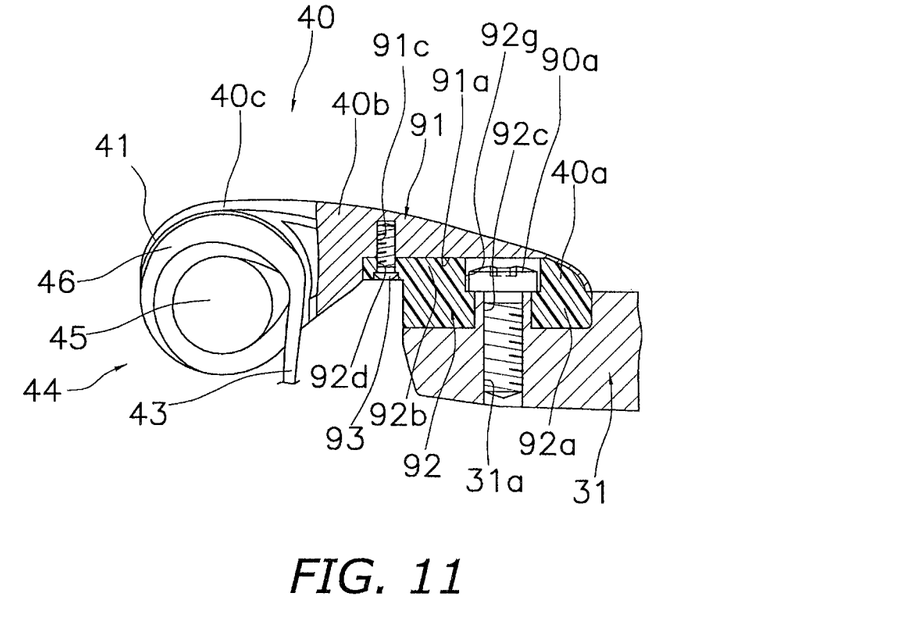
FIG. 11 is a another diagram corresponding to FIG. 10 according to the second embodiment.

(g) In the aforementioned second embodiment, the outer member 91 has the first through hole 91b inserting therein the fixation member 90. However, as illustrated in FIG. 11, the outer member 91 can not have the first through hole 91b. The fixation member 92 may be herein fixed to the outer member 91 after the inner member 92 is fixed to the first rotor arm 31. In this case, the head of the fixation member 90 is not exposed to the outside of the outer member 91. Therefore, the fishing line can be prevented from getting stuck with the head of the fixation member 90.

Advantageous Effects of Invention

According to the present invention, the support member is formed by the outer member made of metal and the inner member made of synthetic resin. Accordingly, reduction in weight of the support member can be achieved compared to the support member entirely made of metal. This makes it possible to reduce the weight of the fishing line guide mechanism. Further, the structure formed on the inner surface of the support member can be formed by molding not by machining. Therefore, it is possible to inhibit cost increase in manufacturing the support member.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A spinning reel fishing line guide mechanism for guiding a fishing line onto a spool, the spinning reel fishing line guide mechanism attached to a tip of a rotor arm and being pivotable between a fishing-line guide position and a fishing-line release position, the spinning reel fishing line guide mechanism comprising:
- a support member being attached pivotably to the tip of the rotor arm and including an outer member made of metal and an inner member made of synthetic resin, the inner member being fixed to an inner surface of the outer member, and being coupled to the rotor arm, so as to separate the rotor arm and the outer member.

2. The spinning reel fishing line guide mechanism according to claim 1, wherein
the outer member includes a plated outer surface and is made of light metal containing either aluminum alloy or magnesium alloy.

3. The spinning reel fishing line guide mechanism according to claim 1, wherein
the outer member includes a recess with an opening on the inner surface thereof, and
the inner member is attached and fixed to the recess.

4. The spinning reel fishing line guide mechanism according to claim 1, wherein
the inner member is fixed to the inner surface of the outer member by a screw.

5. The spinning reel fishing line guide mechanism according to claim 1, wherein
the inner member is fixed to the inner surface of the outer member by welding.

6. The spinning reel fishing line guide mechanism according to claim 1, further comprising
a fixation shaft being fixed at an end thereof to the support member; and
a line roller configured to support rotatably by the fixation shaft, the line roller including a roller on a circumferential surface thereof, the roller being configured to guide the fishing line.

7. A spinning reel attached to a fishing rod and enabled to forwardly release a fishing line, the spinning reel comprising;
a reel unit attached to the fishing rod;
a spool shaft mounted to the reel unit and being movable along a back-and-forth direction;
a spool mounted to a front end of the spool shaft, the spool allowing the fishing line to be wound onto an outer periphery thereof;
a rotor disposed rotatably on an outer peripheral side of the spool, the rotor including a rotor arm on a tip thereof, the rotor winding the fishing line onto the spool; and
the spinning reel fishing line guide mechanism according to claim 1.

* * * * *